(12) United States Patent
O

(10) Patent No.: US 10,228,104 B2
(45) Date of Patent: Mar. 12, 2019

(54) SUNLIGHT TRANSMITTER

(71) Applicant: SUNPORTAL Co., Ltd., Busan (KR)

(72) Inventor: Se Dae O, Yangsan-si (KR)

(73) Assignee: SUNPORTAL Co., Ltd., Busan (KR)

( * ) Notice: Subject to any disclaimer, the term of this patent is extended or adjusted under 35 U.S.C. 154(b) by 0 days.

(21) Appl. No.: 15/599,440

(22) Filed: May 18, 2017

(65) Prior Publication Data

US 2017/0343171 A1    Nov. 30, 2017

(30) Foreign Application Priority Data

May 26, 2016  (KR) ........................ 10-2016-0064650

(51) Int. Cl.
| | | |
|---|---|---|
| *F21S 11/00* | (2006.01) | |
| *G02B 19/00* | (2006.01) | |
| *G02B 27/30* | (2006.01) | |
| *G02B 7/02* | (2006.01) | |
| *G02B 5/02* | (2006.01) | |

(52) U.S. Cl.
CPC .......... *F21S 11/002* (2013.01); *F21S 11/007* (2013.01); *G02B 5/0278* (2013.01); *G02B 7/022* (2013.01); *G02B 19/0023* (2013.01); *G02B 19/0042* (2013.01); *G02B 27/30* (2013.01)

(58) Field of Classification Search
CPC .............................. F21S 11/002; F21S 11/007
USPC .................................................. 359/592–593
See application file for complete search history.

(56) References Cited

U.S. PATENT DOCUMENTS

| | | | | | |
|---|---|---|---|---|---|
| 1,254,520 | A | * | 1/1918 | MacDuff ................. | F21S 11/00 359/592 |
| 4,306,769 | A | * | 12/1981 | Martinet ................. | E04D 13/03 359/597 |
| 4,394,860 | A | * | 7/1983 | Smith ..................... | F24S 23/00 126/685 |
| 4,425,905 | A | * | 1/1984 | Mori ....................... | F24S 23/30 126/578 |
| 4,874,225 | A | * | 10/1989 | Pruszenski, Jr. ....... | A01G 9/243 359/592 |
| 8,743,462 | B2 | * | 6/2014 | Freier ................. | G02B 19/0023 359/596 |
| 8,885,995 | B2 | * | 11/2014 | Morgan .............. | H01L 31/0525 385/33 |
| 2008/0266664 | A1 | * | 10/2008 | Winston ................ | F21S 11/00 359/592 |

FOREIGN PATENT DOCUMENTS

WO    WO 2012108693 A2  *  8/2012 ............ F21S 11/007

* cited by examiner

*Primary Examiner* — Christopher E Mahoney
(74) *Attorney, Agent, or Firm* — Revolution IP, PLLC

(57) ABSTRACT

Disclosed is a sunlight transmitter, and more particularly to a sunlight transmitter according to an embodiment of the present invention is used as a transmission device of solar light to transmit sunlight into an indoor space by condensing and converting the sunlight into straight parallel light, and maximizes a sunlight transmission efficiency by minimizing loss in condensing the sunlight and obtaining not only the straight parallel light of high luminous flux but also diffused light through hybrid condensation.

7 Claims, 7 Drawing Sheets

SUNLIGHT TRANSMITTER

CROSS-REFERENCE TO RELATED APPLICATION

This application claims priority from Korean Patent Application No. 10-2016-0064650, filed on May 26, 2016 in the Korean Intellectual Property Office, the disclosure of which is incorporated herein by reference.

BACKGROUND OF THE INVENTION (a) Field of the Invention

The present invention relates to a sunlight transmitter, and more particularly to a sunlight transmitter which is used as a transmission device of solar light to transmit sunlight into an indoor space by condensing and converting the sunlight into straight parallel light, and maximizes a sunlight transmission efficiency by minimizing loss in condensing the sunlight and obtaining not only the straight parallel light of high luminous flux but also diffused light through hybrid condensation.

(b) Description of the Related Art

In general, if it is difficult to introduce sunlight to an indoor space, artificial illumination is needed to keep indoor illuminance even in daytime. By the way, the artificial illumination has problems of consuming power too much and thus increasing expense due to the power consumption.

To solve the foregoing problems, a sunlight transmitter has been developed to introduce natural light, i.e. sunlight into an indoor space.

However, a conventional sunlight transmitter has problems of causing optical loss in condensing sunlight, and making light introduced into an indoor space have non-uniform illuminance since quantity of light decreases as a transmission distance becomes longer.

SUMMARY OF THE INVENTION

Accordingly, the present invention is conceived to solve the foregoing problems, and an object of the present invention is to provide a sunlight transmitter which is used as a transmission device of solar light to transmit sunlight into an indoor space by condensing and converting the sunlight into straight parallel light, and maximizes a sunlight transmitting efficiency by not only minimizing loss in condensing the sunlight but also obtaining both the straight parallel light of high luminous flux and diffused light through hybrid condensation.

In accordance with an embodiment of the present invention, there is provided a sunlight transmitter comprising: a case which is formed with a through hole at a center thereof; a condensing member is mounted to an inside of the case at a first end of the case, and refracts and condenses incident sunlight into a focusing region; and a light converting member which converts the condensed light collected in a focusing region at a second end of the case into parallel light and transmitting the parallel light toward the through hole, where the condensing member and the light converting member are formed as a single body inside the case.

The condensing member may comprise a concave mirror having a predetermined curvature for refracting and reflecting the incident sunlight toward a focusing region, and the light converting member may comprise a convex mirror for reflecting and converting the light refracted toward the focusing region into the parallel light.

The light converting member may comprise a coupling groove for coupling with a lens; a transparent lens for coupling with the coupling groove may be further provided; and the light converting member may be fastened to the transparent lens through the coupling groove, and the transparent lens may be coupled to the inside of the case at the second end of the case so that the light converting member can be stably installed in the focusing region without any separate supporting structure.

The light converting member may comprise a coupling groove for coupling with a lens and a refractive lens fastened to the coupling groove is further provided; or the refractive lens integrally formed on an outer circumference of the light converting member may be further provided; and both parallel light converted by the light converting member and diffused light refracted by the refractive lens may be introduced indoors through the through hole.

The light converting member and the transparent lens may be coupled, and the transparent lens may be manufactured so that a refractive lens is formed only in a coupling portion of the light converting member, and couple with the light converting member so that both parallel light converted by the light converting member and diffused light refracted by the refractive lens are introduced indoors through the through hole.

An edge region of the through hole of the condensing member and the case may be formed with a diffused-light refractive lens for refracting diffused light diffused by the refractive lens indoors.

At least two condensing member sections among a plurality of condensing member sections may be assembled into the condensing member.

The condensing member may further comprise a mounting frame to which the plurality of condensing member sections are mounted, and the condensing member sections may be assembled into the condensing member in such a manner that the plurality of condensing member sections are fitted and mounted to the mounting frame.

BRIEF DESCRIPTION OF THE DRAWINGS

The above and/or other aspects of the present invention will become apparent and more readily appreciated from the following description of the exemplary embodiments, taken in conjunction with the accompanying drawings, in which.

DETAILED DESCRIPTION

Below, embodiments of the present invention will be described in detail with reference to accompanying drawings.

Figure 1:
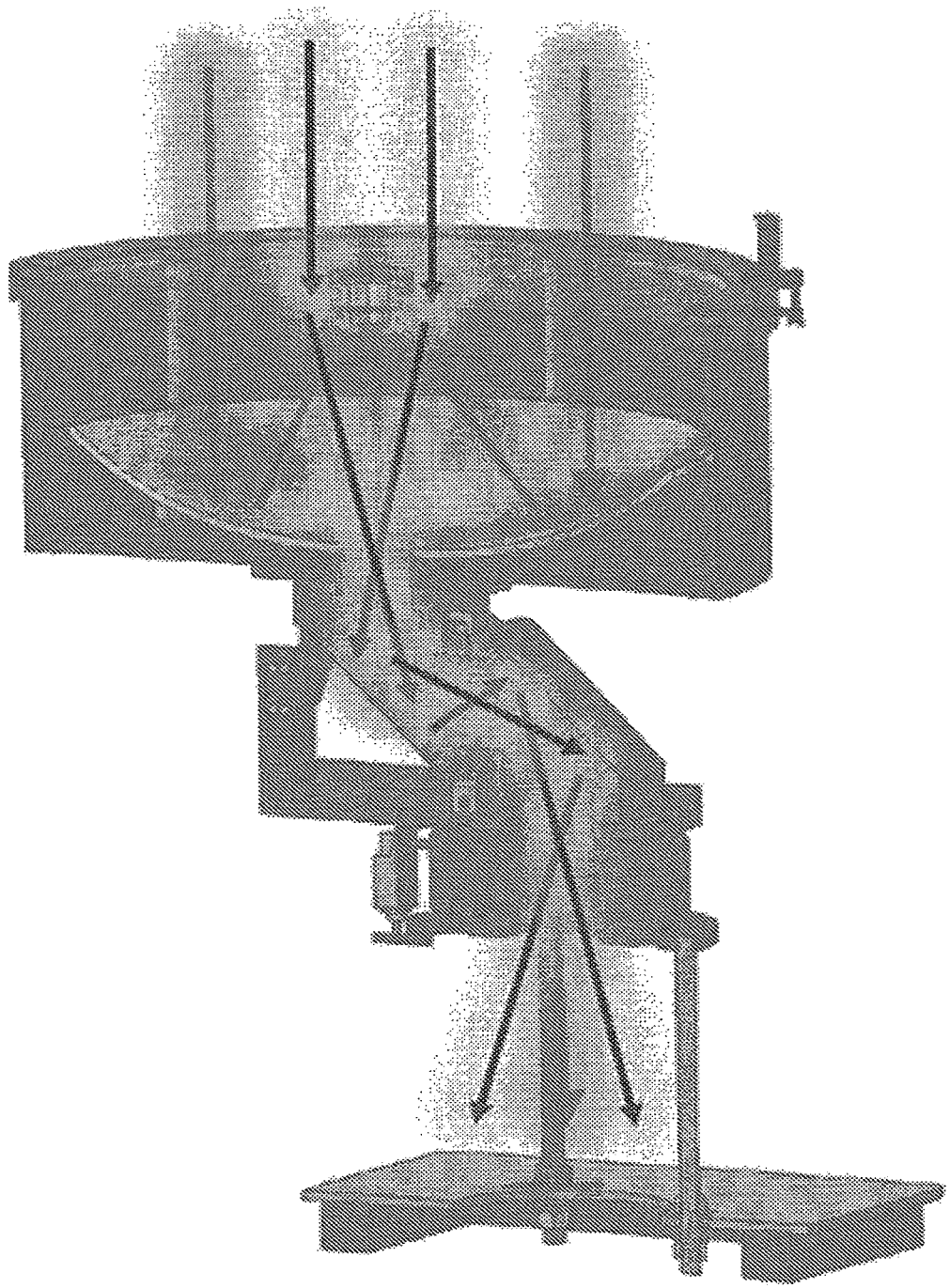
FIG. 1 is a conceptual view of showing an optical path through which straight parallel light and diffused light are simultaneously introduced into an interior according to an embodiment of the present invention.
Figure 2:
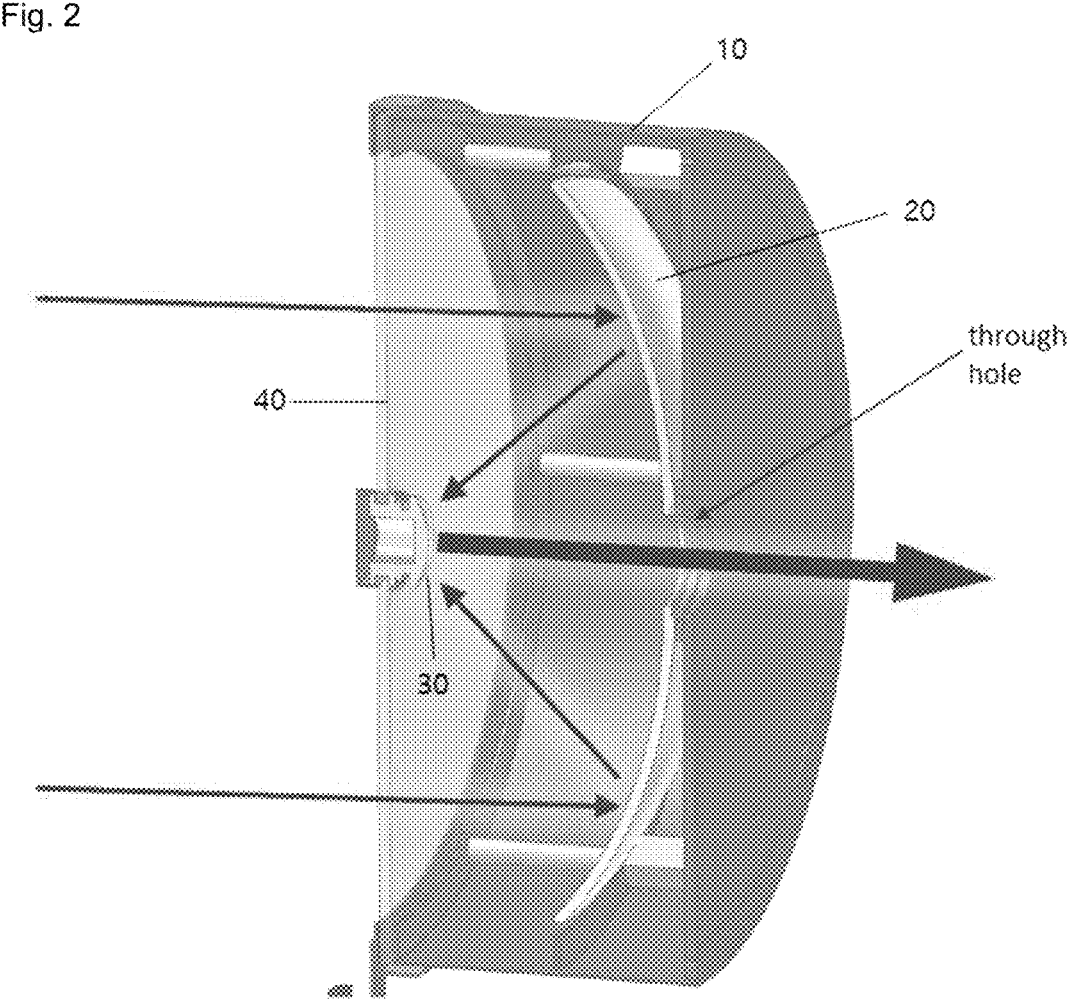
FIG. 2 is a structural view of schematically showing a sunlight transmitter according to an embodiment of the present invention.

FIG. 1 is a conceptual view of showing an optical path through which straight parallel light and diffused light are simultaneously introduced into an interior according to an embodiment of the present invention, and FIG. 2 is a structural view of schematically showing a sunlight transmitter according to an embodiment of the present invention.

Referring to FIGS. 1 and 2, a sunlight transmitter according to an embodiment of the present invention includes a case 10 formed with a through hole at the center thereof; a condensing member 20 mounted to the inside of the case 10 at a first end of the case 10 and refracting and condensing incident sunlight into a focusing region; and a light converting member 30 converting the condensed light collected in a focusing region at a second end of the case 10 into parallel light and transmitting the parallel light toward the through hole.

The condensing member 20 may be achieved by a concave mirror having a certain curvature to refract and reflect the introduced sunlight toward the focusing region. Further, the light converting member 30 may be achieved by a convex mirror to reflect and convert the light refracted toward the focusing region into the parallel light. Here, the curvatures of the concave mirror and the convex mirror may be varied depending on the size of the case, the amount of solar radiation in a location where they are installed, and the like environmental factors.

Further, a transparent lens 40 may be provided at the second end of the case 10 to enhance light transmittance, and the light converting member 30 penetrates and is coupled to the center of the transparent lens 40 so that the light converting member 30 and the condensing member 20 can be integrally formed within the case 10.

The transparent lens 40 not only improves the light transmittance but also prevents foreign materials of the exterior or rain or snow on a rainy or snowy day from being introduced into the case 10, thereby serving as a protection cover to improve durability.

Here, the breadth between the first and second ends of the case 10 and the curvature of the condensing member 20 may be varied depending on a distance between the condensing member 20 and the focusing region.

The light converting member 30 may be formed with a coupling groove at a back end portion of its own lens so as to couple with the transparent lens 40. By the coupling groove, the light converting member 30 and the transparent lens 40 can be coupled as a single body. Therefore, the light converting member 30 is fastened to the transparent lens 40 by the coupling groove, and the transparent lens 40 is coupled to the inside of the case 10 at the second end of the case 10, thereby stably installing the light converting member 30 in the focusing region without any separate supporting structure.

In addition, a refractive lens 50 is fastened to the coupling groove of the light converting member 30 and refracts the sunlight to enter the through-hole region, thereby improving an optical efficiency.

Light introduced in the vicinity of the outside of the light converting member 30 is introduced in the vicinity of the through hole, i.e. a center portion of the condensing member 20, but radiates outward and is thus lost rather than introduced into the light converting member 30 even though it is reflected from the condensing member 20 since the curvature of the condensing member 20 approximates to a plane.

Therefore, the refractive lens 50 provided in the outer circumference of the light converting member 30 minimizes the loss of the outward light.

As above, if the refractive lens 50 is coupled to the outer circumference of the light converting member 30, light passed through the refractive lens 50 is not refracted by the condensing member 20, but diffused and directly introduced into the through hole.

The straight parallel light converted by the light converting member 30 is increased in luminous flux but decreased in light diffusion for uniform illumination throughout a broad area due to properties of a laser and the like rectilinear propagation light. However, the refractive lens 50 introduces the diffused light indoors and increases the light diffusion, thereby transmitting the sunlight throughout the broad area of the indoor space.

Here, the refractive lens 50 may be achieved by a Fresnel lens for refracting and condensing incident light toward a center portion.

Figure 3:
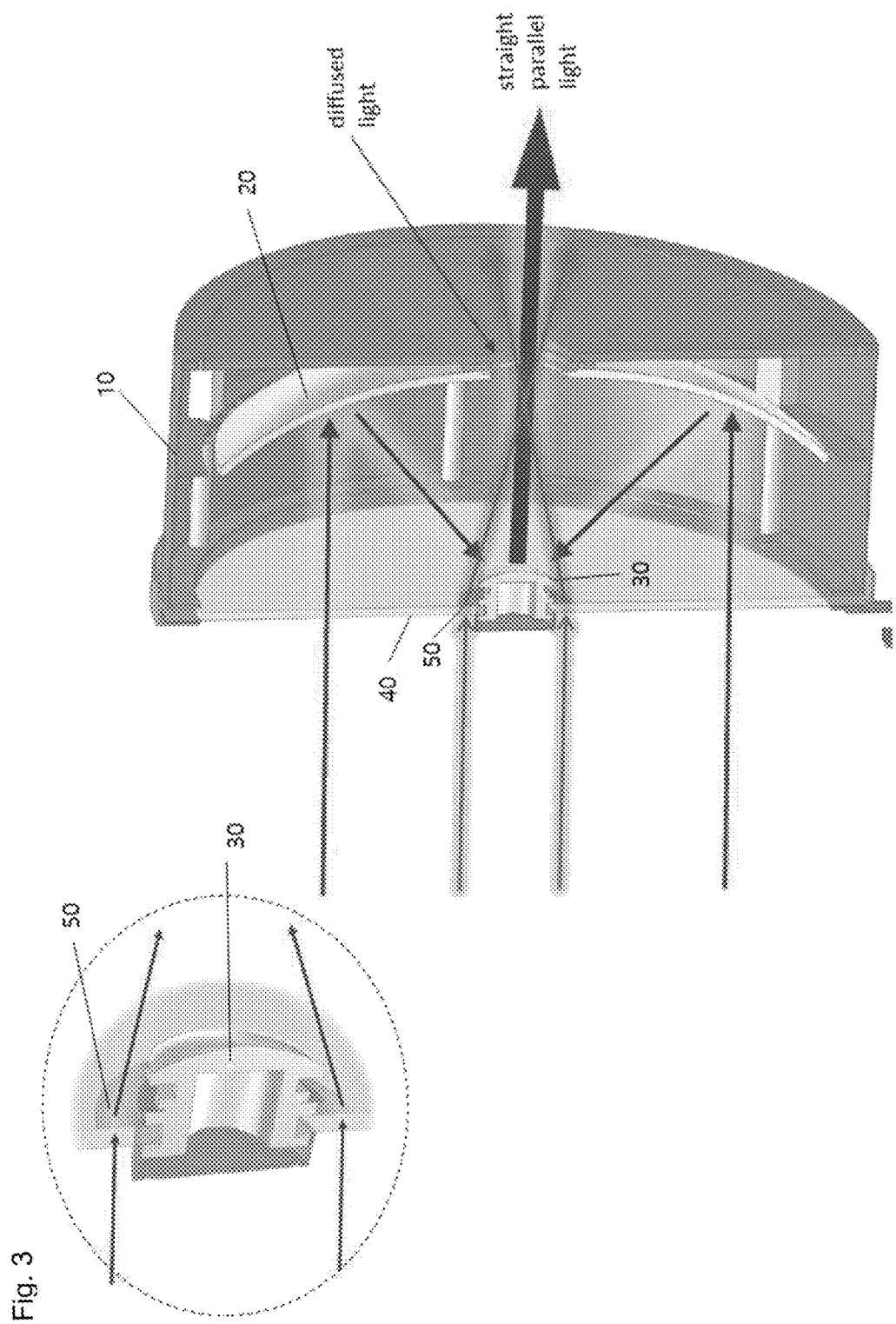
FIG. 3 is a structural view of schematically showing a sunlight transmitter in which a refractive lens is formed on an outer circumstance of a light converting member.

The refractive lens 50 may be set back from a light entry portion of the light converting member 30 as shown in FIG. 3 rather than coaxially with the light converting member 30. If the refractive lens is formed in the outer circumference on the same axial line with the light converting member 30, it is possible to block out the light being introduced into the condensing lens. However, if the refractive lens is set ahead of the light converting member 30 with respect to the light entry portion, it is possible to previously refract light and introduce diffused light without blocking out the light, which enters the coaxial outer circumference of the light converting member and is then introduced into the condensing lens, thereby enhancing an optical efficiency.

Further, if the refractive lens 50 is too large, it may block out the light introduced to the condensing member 20 and thus decrease the amount of straight parallel light. On the other hand, if the refractive lens 50 is too small, it may have an inadequate effect of introducing the diffused light. Therefore, the refractive lens 50 may be formed as large as possible so as to make the minimum decrease in the amount of straight parallel light. Here, the size of the refractive lens 50 may be varied depending on the curvature of the condensing lens around the through hole. If the curvature of the condensing lens is large, the refractive lens has to have a small area. On the other hand, if the curvature of the condensing lens is small, the refractive lens may have a large area.

By the way, the light converting member 30 and the transparent lens 40 are coupled as shown in FIG. 3. To this end, the transparent lens 40 may be manufactured so that the refractive lens 50 can be formed only in a region extended from a coupling portion of the light converting member 30, thereby coupling with the light converting member 30.

Figure 4:
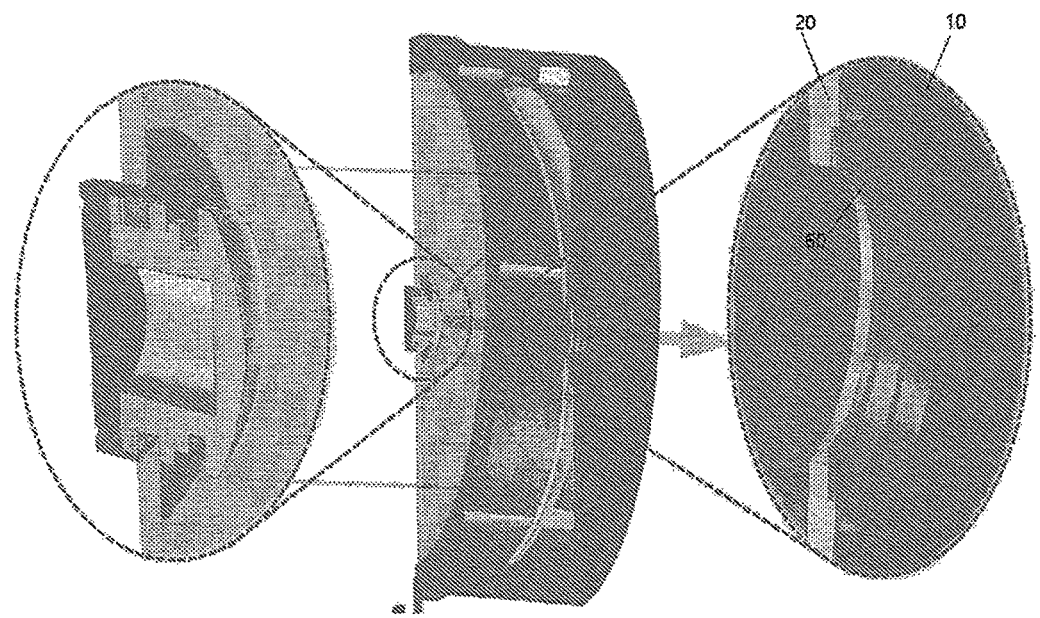
FIG. 4 schematically shows that a reflective lens for diffused light is formed in a through-hole region of a condensing member and a case according to an embodiment of the present invention.

FIG. 4 schematically shows the case according to an embodiment of the present invention and a diffused-light refractive lens 60 is formed in the through-hole region of the condensing member.

Referring to FIG. 4, the through-hole region refers to a space to which the straight parallel light is introduced in principle, and therefore there are no needs of a separate lens. However, if the refractive lens is formed together with the light converting member, the diffused light has to be refracted to be introduced inward, and therefore the diffused-light refractive lens 60 is additionally provided in the through-hole region.

The diffused-light refractive lens 60 may be formed only in an edge region of the through hole so as to have an opened center portion for securing a space through which the straight parallel light will be introduced, thereby forming a reflective lens to refract and introduce the diffused light.

Figure 5:
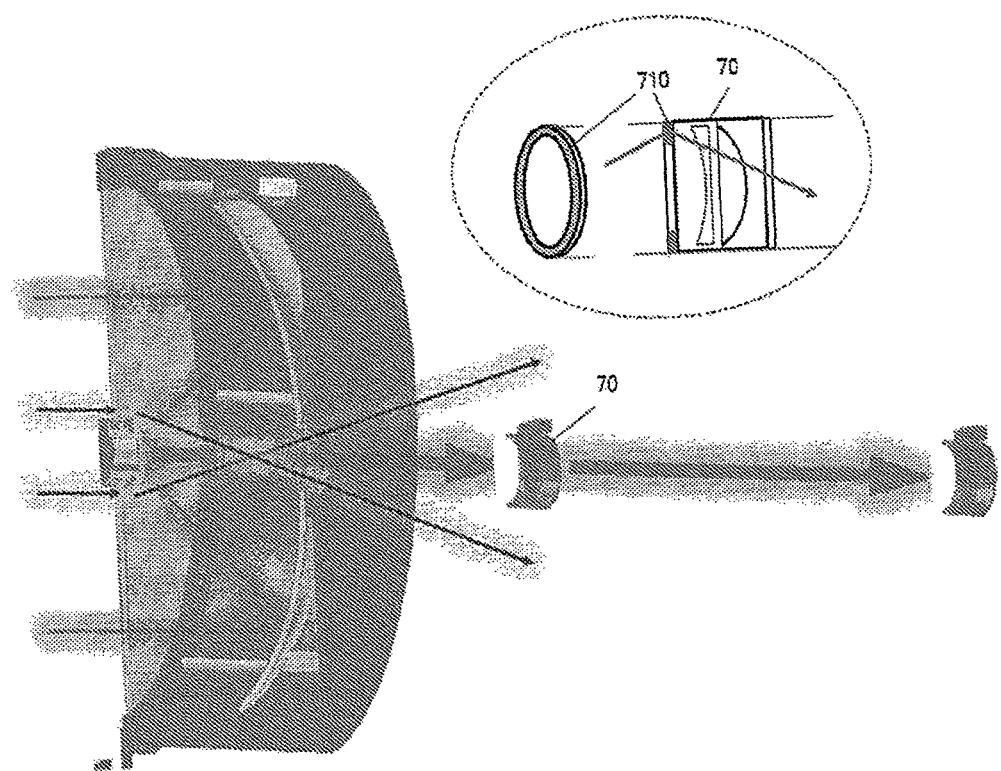
FIG. 5 schematically shows a relay lens unit for converting similar parallel light diffused in a light transmission member for transmitting sunlight into straight parallel light according to an embodiment of the present invention.

FIG. 5 schematically shows a relay lens unit for converting similar parallel light, which is diffused in a light transmission member for transmitting sunlight, into straight parallel light according to an embodiment of the present invention.

There is an angle difference of 0.5 degrees between the sun and the earth due to the distance and the difference in size between the sun and the earth. Such an angle difference causes the sunlight converted by the condensing member and the light converting member to be not ideal perfect parallel light but similar parallel light which is a little diffused even though the converted sunlight has high luminous flux.

In result, the theoretical incident sunlight itself is introduced at a certain angle due to the angle difference between the sun and the earth, and it is thus impossible to condense the sunlight into the perfect parallel light.

Therefore, the introduced similar parallel light is diffused while being transmitted through the transmission member, thereby causing optical loss. The loss of the sunlight increases as a transmission distance becomes longer.

To prevent the similar parallel light from being diffused and lost within the light transmission member, a relay lens unit 70 may be additionally provided to condense the similar parallel light again.

Referring to FIG. 5, the relay lens unit 70 for condensing and transmitting the similar parallel light diffused in the light transmission member are provided at regular intervals since the similar parallel light converted by the light converting member is diffused within the transmission member according to the transmission distance and the loss of the diffused light increases as the transmission distance becomes longer.

According to an embodiment of the present invention, the relay lens unit condenses and transmits not only the parallel light but also the diffused light inward since both the straight parallel light and the diffused light are introduced, thereby continuously transmitting the parallel light and the diffused light inward.

The relay lens unit 70 may include a socket formed in the light transmission member, and the relay lens inserted in and mounted to the socket.

The relay lens is achieved by combination of a concave lens and a convex lens as shown in FIG. 5 and condenses the diffused light again.

In the case where the concave lens and the convex lens are combined to for the relay lens, light passed through the concave lens and propagating toward the focusing region is changed into light having high luminous flux of high intensity, incident on the convex lens and condensed up to the focusing region of the convex lens. Therefore, a problem caused by a single concave or convex lens is solved, and it is possible to condense the diffused light again and transmit the condensed light.

In addition, a light refractive lens 710 may be further provided at an edge of the light entry portion of the socket as shown in FIG. 5.

The light refractive lens 710 refracts the inward-introduced diffused light or the diffused straight parallel light inward to continuously transmit the diffused light indoors.

In result, the diffused light introduced indoors through the diffused-light refractive lens 60 formed in the through-hole region is successively refracted indoors by the light refractive lens 710 of the successively formed relay lens unit 70 so that the diffused light can be transmitted indoors deeply.

The light refractive lens 710 of the relay lens unit guides not only the introduced diffused light but also light, which may be diffused from the inward-introduced straight parallel light and lost in the room, to be refracted indoors, thereby continuously transmitting the parallel light and the diffused light inward while minimizing the optical loss.

The intervals where the relay lens units 70 are installed may be varied depending on a position and a scale where a sunlight transmitter is installed, and the size of the light transmission member. Basically, the relay lens units 70 have to be installed at intervals for preventing the introduced similar sunlight from being lost by diffusion. Further, the intervals of the relay lens units 70 may be installed at regular intervals based on optical design, or may be installed at intervals different from one another.

More specifically, the relay lens unit 70 has no optical loss since sunlight incident on a relay lens is fully introduced into the next relay lens if the next relay lens uniy is formed within the focal length F of the previous relay lens.

To improve an efficiency of transmitting light, an anti-reflection coating may be formed on the relay lens. The efficiency of transmitting light in the relay lens, e.g. 99.5%, 95%, etc. may be selectively applied according to the coating methods. Further, the material of the relay lens may be selected among various transparent materials such as BK7, Quartz, PMMA, etc.

Besides, if the relay lens units 70 are formed at maximum intervals where sunlight passing and intersecting the focusing region does not deviate from the neighboring relay lens, the sunlight incident on the first relay lens unit is fully introduced into the second relay lens unit, thereby causing no optical loss.

Figure 6:
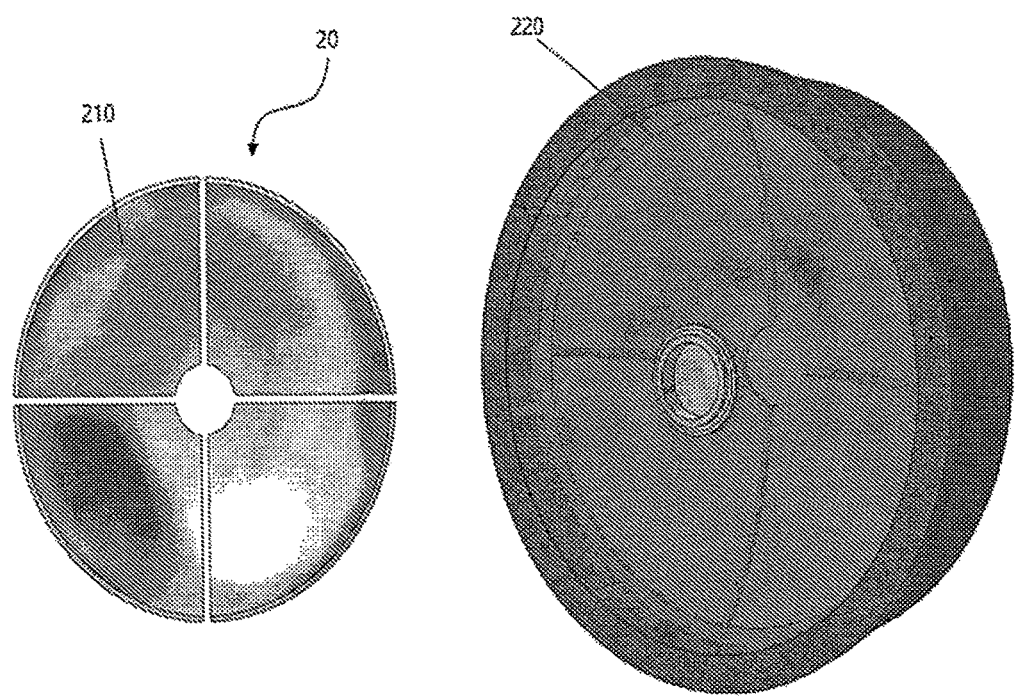
FIG. 6 shows that a condensing member is sectioned according to an embodiment of the present invention.
Figure 7:
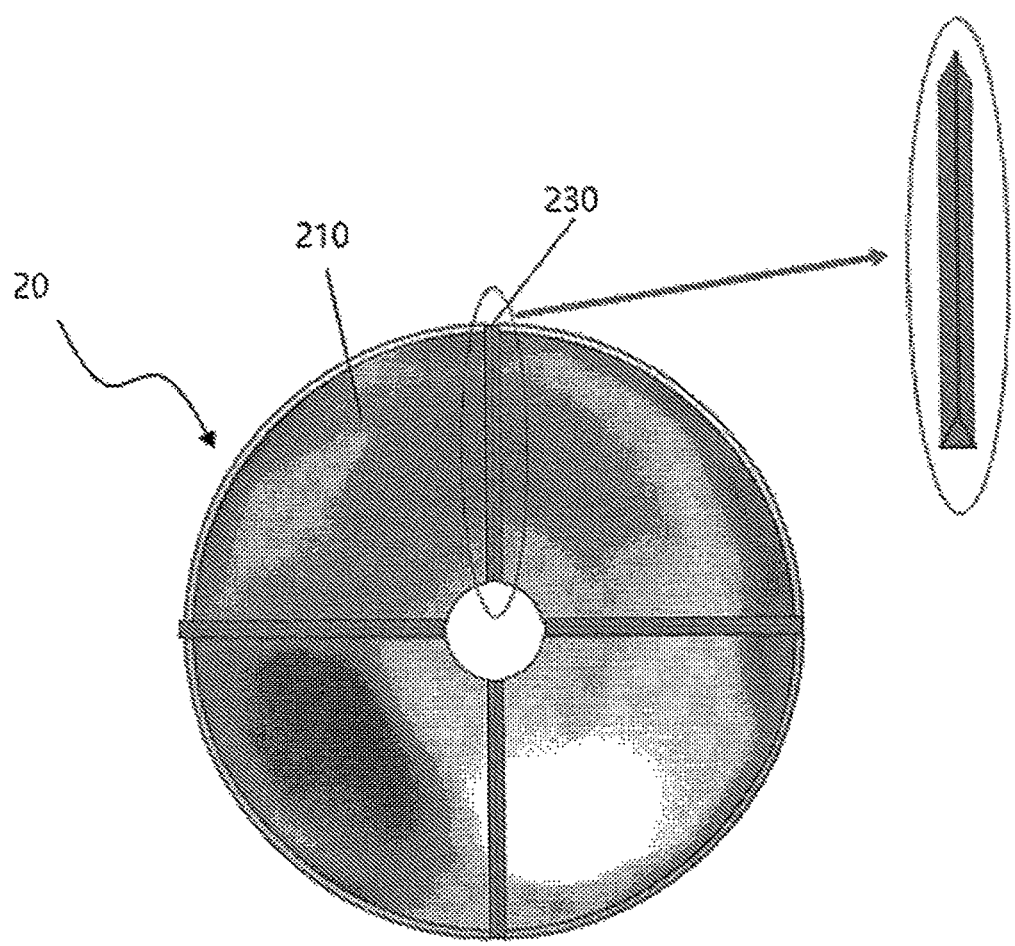
FIG. 7 shows a reflective rib is formed between the sections of the condensing member.

FIG. 6 shows that a condensing member is segmented according to an embodiment of the present invention.

Referring to FIG. 6, the condensing member 20 according to an embodiment of the present invention may be divided into a plurality of sections rather than provided as a single concave mirror having a certain curvature.

The condensing member is expensive and may thus largely increase production costs due to defects since the whole condensing member is not usable when the condensing member has a partial defect. For example, if a condensing member has a trouble with tracking sunlight, the condensing member is highly likely to have a partial defect. Accordingly, the condensing member is manufactured in a sectioned structure as shown in FIG. 6 and then assembled in order to take cost reduction and massive production into account.

As the condensing member 20 is sectioned, only a section corresponding to a partial defect or damage is replaceable, thereby reducing costs of maintenance.

The condensing member may be divided into at least two sections 210. Alternatively, the condensing member may be divided into two to six sections.

In more detail, the condensing member 20 may further include a mounting frame 220 to which a condensing member section 210 and a condensing member section 210 are fitted and mounted.

In such a manner that the condensing member section 210 is fitted and mounted to the mounting frame 220, a plurality of condensing member sections 210 are assembled to form the condensing member 20.

To this end, the mounting frame 220 is formed with a groove to which the condensing member section 210 is fitted. Thus, the condensing member section 210 is fitted and mounted to the groove of the mounting frame 220.

After the condensing member 20 is formed by inserting and fixing the condensing member sections 210 to the mounting frame 220, the mounting frame 220 is coupled to a condensing member mounting portion inside the case so that the condensing member can be mounted to the inside of the case.

By the way, optical loss may occur in an interface between the condensing member sections. Therefore, a reflective rib 230 may be further provided in between the condensing member sections and protrude in a triangular shape for reflecting light.

The reflective rib 230 may be fitted and mounted to the mounting frame 220. When there is a need of replacing the condensing member section 210, the reflective rib 230 is first removed and then the condensing member section 210 is separated and replaced.

Besides, the reflective rib 230 may serve as a wedge to not only keep a distance between the condensing member sections but also hold the condensing member sections.

As described above, a sunlight transmitter according to an embodiment of the present invention is used as a transmission device of solar light to transmit sunlight into an indoor space by condensing and converting the sunlight into straight parallel light, and maximizes a sunlight transmission efficiency by minimizing loss in condensing the sunlight and obtaining not only the straight parallel light of high luminous flux but also diffused light through hybrid condensation.

Although a few exemplary embodiments of the present invention have been shown and described, these are for illustrative purpose only and it will be appreciated by those skilled in the art that changes may be made in these embodiments without departing from the principles and spirit of the invention, the scope of which is defined in the appended claims and their equivalents.

What is claimed is:

1. A sunlight transmitter comprising:
   a case which is formed with a through hole at a center thereof;
   a condensing member which is mounted to an inside of the case at a first end of the case, and refracts and condenses incident sunlight into a focusing region; and
   a light converting member which converts the condensed light collected in a focusing region at a second end of the case into parallel light and transmitting the parallel light toward the through hole;
   a refractive lens coupled with the light converting member by a groove formed in the light converting member or integrally formed on an outer circumference of the light converting member,
   wherein the condensing member and the light converting member are formed as a single body inside the case,
   both parallel light converted by the light converting member and diffused light refracted by the refractive lens are introduced inward through the through hole,
   the light converting member comprises a coupling groove and a transparent lens coupled with the coupling groove,
   the light converting member is fastened to the transparent lens through the coupling groove, and
   the transparent lens is coupled to the inside of the case at the second end of the case so that the light converting member is stably installed in the focusing region without any separate supporting structure.

2. The sunlight transmitter according to claim 1, wherein the condensing member comprises a concave mirror having a predetermined curvature for refracting and reflecting the incident sunlight toward a focusing region, and
   the light converting member comprises a convex mirror for reflecting and converting the light refracted toward the focusing region into the parallel light.

3. The sunlight transmitter according to claim 1, wherein the light converting member and the transparent lens are coupled, and
   the transparent lens is manufactured so that the refractive lens is formed only in a coupling portion of the light converting member, and couples with the light converting member so that both parallel light converted by the light converting member and diffused light refracted by the refractive lens are introduced indoors through the through hole.

4. The sunlight transmitter according to claim 3, wherein an edge region of the through hole of the condensing member and the case is formed with a diffused-light refractive lens for refracting diffused light diffused by the refractive lens indoors.

5. The sunlight transmitter according to claim 1, wherein an edge region of the through hole of the condensing member and the case is formed with a diffused-light refractive lens for refracting diffused light diffused by the refractive lens indoors.

6. The sunlight transmitter according to claim 1, wherein at least two condensing member sections among a plurality of condensing member sections are assembled into the condensing member.

7. The sunlight transmitter according to claim 6, wherein the condensing member further comprises a mounting frame to which the plurality of condensing member sections are mounted, and
   the condensing member sections are assembled into the condensing member in such a manner that the plurality of condensing member sections are fitted and mounted to the mounting frame.

\* \* \* \* \*